Patented June 24, 1930

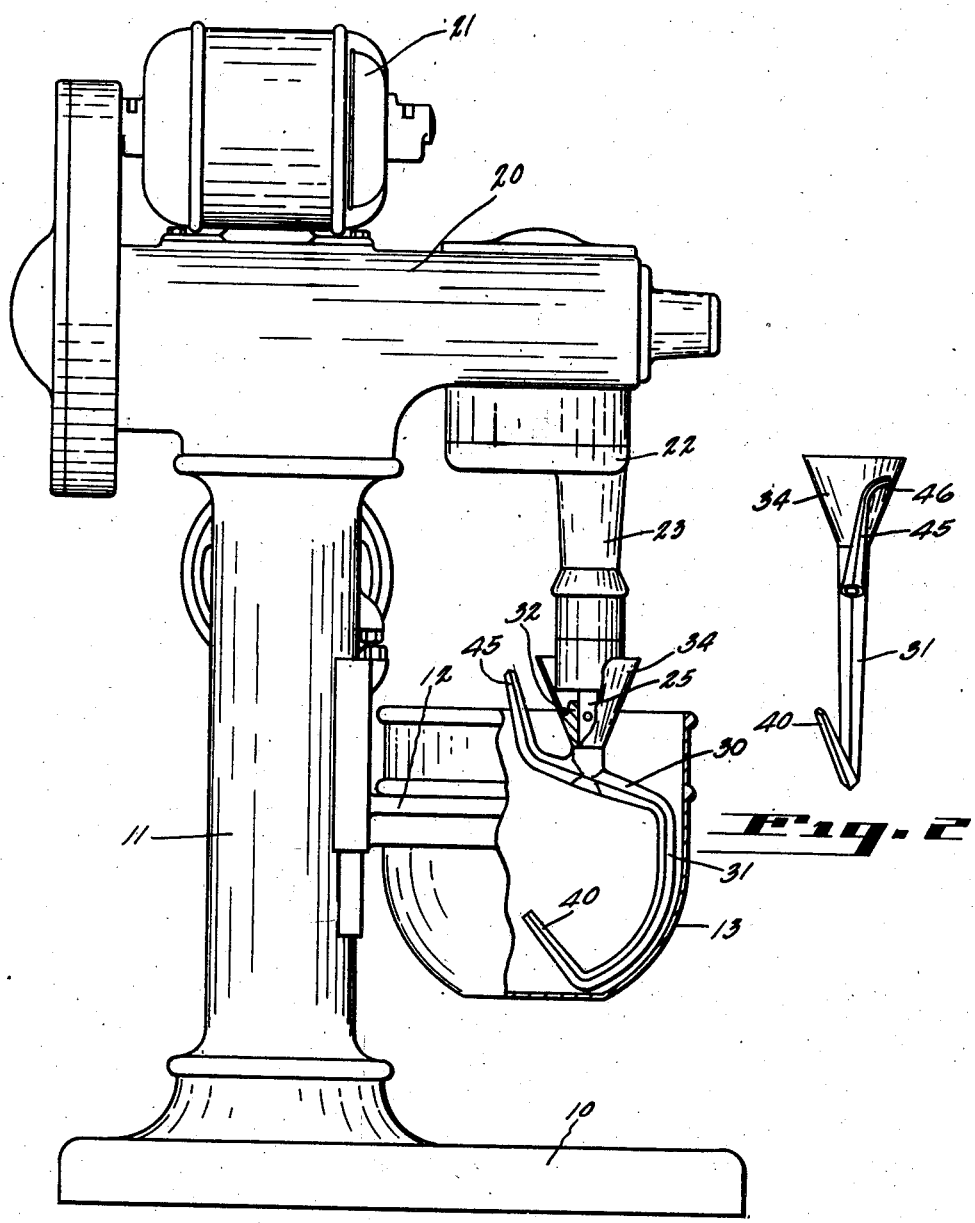

1,766,942

UNITED STATES PATENT OFFICE

THOMAS F. RATAICZAK AND MILTON K. AKERS, OF TROY, OHIO, ASSIGNORS TO THE HOBART MANUFACTURING COMPANY, OF TROY, OHIO, A CORPORATION OF OHIO

APPARATUS FOR TREATING FOODSTUFFS

Application filed September 24, 1926. Serial No. 137,503.

This invention relates to mixing machines, and particularly to machines for mixing foodstuffs such as bread dough, cake dough, and the like.

One of the principal objects of this invention is to provide an efficient and effectively operating mixing machine of this character which is simple in construction and reliable in operation.

Another object of this invention is to provide an improved beater adapted for use with such a mixing machine, which is particularly efficient and effective in operation.

Other objects and advantages of this invention will be apparent from the following description when taken in connection with the accompanying drawing.

In the drawing in which like characters of reference designate like parts throughout the several views thereof, Fig. 1 is a side elevation of a mixing machine constructed in accordance with this invention, having certain parts broken away and in section to more clearly illustrate the construction thereof; and Fig. 2 is an elevational view of the beater, taken at right angles to the view of the beater in Fig. 1 and looking from the left-hand side thereof.

In the embodiment of the invention illustrated herein, a mixing machine is shown comprising a base 10 carrying a standard 11, upon which is mounted a bowl-supporting ring 12 carrying a suitable mixing bowl 13. Positioned at the upper end of the standard 11 is a casing 20, housing suitable gear transmission, driven by a motor 21. Rotatably mounted upon the portion of the casing 20 which overhangs the bowl is a rotary head 22 which is driven by the motor through the gear transmission. Rotatably mounted within a downward extension 23 of the head 22 and also operatively connected to the gear transmission so as to be rotated thereby within the head 22 is a shaft 25 the lower end of which is formed to detachably receive a beater, stirrer or other tool, for operating upon dough, or other material within the bowl. The construction and arrangement of these parts is such that a planetary motion is imparted, the shaft 25 rotating on its own axis, and at the same time moving bodily through a circular path as the head 22 rotates. The driving mechanism and gearing for imparting this motion to the driven shaft 25 from the driving motor 21 is not illustrated, as such mechanism is well known in the art, and any suitable driving connections between the motor 21 and the driven shaft 25 may be used to impart motion thereto.

Connected to the depending driven shaft 25 is a beater which comprises a main body portion 30, which is shown as curved outwardly and downwardly as at 31 to conform somewhat to the interior shape of the mixing bowl 13. At its upper end the main body portion is formed with attaching means which may be of any suitable character but is shown as a hub portion 32 having a socket therein to receive the lower end of the shaft 25—a bayonet slot and pin connection being provided for interconnecting the beater and operating shaft. Surrounding the attaching means is a cone-shaped anti-creeping member 34, which functions during operation to prevent the dough, or other material in the bowl, from winding around the attaching means and creeping up onto the shaft 25.

The lower part of the curved main body portion is shown as in substantial vertical alignment with the attaching member 32 and the shaft 25, although this construction may be varied as desired. Attached to the lower end of the main body portion, and preferably formed integrally therewith, and extending upwardly and away from the curved body portion is a projecting arm 40. This arm is inclined away from the general plane of the body of the beater, and during rotation of the beater within the cup member 13, the material as it is being agitated and mixed is given an upward movement. Attached to the upper end of the main body portion preferably in the location shown and also preferably formed integrally therewith, is an upwardly projecting arm 45. This arm is also inclined away from the general plane of the body of the beater, the inclination however being opposite to the inclination of the lower arm 40. In addition the free end of this upper arm is downturned, as indicated particularly by the numeral 46 in Fig. 2. During mixing operations this upper arm tends to produce a downward thrust upon the material being mixed, to thus maintain the material within the path of movement of the lower arm and the body portion. At the same time the lower arm gives an upward thrust to the material in the bowl and as a result a very effective mixing action is produced. As a result an effectiveness of operation hitherto unknown is attained, the capacity of the device over similar devices using beaters of other construction is multiplied several times.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. For use in a mixing machine of the class described, a beater comprising a downwardly extending main body portion, an arm attached to said main body portion at the upper end thereof and inclined to the general plane of the body portion of the beater, a second arm attached to said body portion at the lower end thereof, and oppositely inclined with respect to the general plane of the body portion and inclined with respect to each other.

2. For use in a mixing machine, a beater comprising an attaching means, a downwardly projecting main body portion, an outwardly projecting arm attached to said main body portion adjacent the upper end thereof, and an upwardly projecting arm attached to said main body portion at the lower end thereof, said arms being oppositely inclined with respect to the general plane of said main body portion to exert thrusts on the material acted on in the general direction of the main body portion.

3. For use in a mixing machine, a beater comprising an attaching means, a downwardly projecting and outwardly curved main body portion, an upwardly projecting arm attached to said main body portion at the upper end thereof, and an upwardly projecting arm attached to said main body portion adjacent the lower end thereof.

4. For use in a mixing machine, a beater comprising an attaching means, a downwardly projecting and outwardly curved main body portion, an outwardly and upwardly projecting arm attached to said main body portion at the upper end thereof, and an upwardly projecting arm attached to said main body portion at the lower end thereof, said arms being oppositely inclined with respect to the general plane of said main body portion respectively.

5. For use in a mixing machine, a beater comprising an attaching means, a downwardly projecting main body portion, and an outwardly and upwardly projecting arm attached to said main body portion at the upper end thereof, said arm being overturned adjacent its free end.

6. For use in a mixing machine, a beater comprising an attaching means, a downwardly projecting main body portion, and an outwardly and upwardly projecting arm attached to said main body portion at the upper end thereof, said arm being inclined to the general plane of the said body portion and downturned adjacent its free end.

7. For use in a mixing machine of the class described, a beater comprising an attaching means, a downwardly projecting and outwardly curved main body portion, and an upwardly projecting arm attached to said main body portion at the lower end thereof, said arm inclined away from the plane of the outwardly curved body portion to produce a thrust which has a substantial vertical component on the material acted upon.

8. For use in a mixing machine, a beater comprising an attaching means, a downwardly projecting main body portion, and an upwardly projecting arm attached to said main body portion at the upper end thereof, said arm being curved throughout a portion of its length, and an upwardly projecting arm attached to said main body portion at the lower end thereof, said arms being oppositely inclined with respect to the main body portion so as to exert thrusts in the direction of the axis of rotation in opposing directions.

9. In a mixing machine, a mixing bowl adapted to hold material to be mixed, and a beater adapted for rotational and bodily movement within said bowl to move within the material to be mixed, said beater comprising a downwardly projecting and outwardly curved main body portion, an upwardly projecting arm attached to said main body portion at the upper end thereof, and an upwardly projecting arm attached to said main body portion at the lower end thereof so as to extend upwardly away from the bottom of the bowl, said arms being oppositely inclined with respect to the general plane of said main body portion.

10. For use in a mixing machine, a beater comprising a downwardly extending main body portion, attaching means at the upper end thereof, and means at the upper end of said main body portion for exerting a downward thrust on the material acted upon.

11. For use in a mixing machine of the class described, a beater comprising an attaching means, a downwardly projecting curved main body portion extending from said attaching means, and an outwardly and upwardly projecting continuation of said body portion at the upper end thereof lying on the opposite side of the axis of rotation from said body portion, for exerting a downward thrust on the material acted upon.

12. For use in a mixing machine, a beater comprising a body portion, an arm attached to said body portion at one end thereof for producing a downward thrust on the material acted on, and a second arm provided on said body portion at the lower end thereof and inclined so as to produce an upward thrust on the material.

13. In a mixing machine of the class described, a mixing bowl adapted to hold material to be mixed, and a beater adapted for rotational and planetary movement within said bowl, said beater comprising a downwardly projecting and outwardly curved main body portion and an upwardly projecting arm at the bottom of said main body portion extending upwardly away from the bottom of the bowl and terminating in an end spaced considerably above the bottom of the bowl, said upwardly projecting arm being laterally inclined to the vertical plane passing through said beater axis and the body portion of said beater to give an upward thrust to material being mixed within said bowl.

In testimony whereof we hereto affix our signatures.

THOMAS F. RATAICZAK.
MILTON K. AKERS.